UNITED STATES PATENT OFFICE.

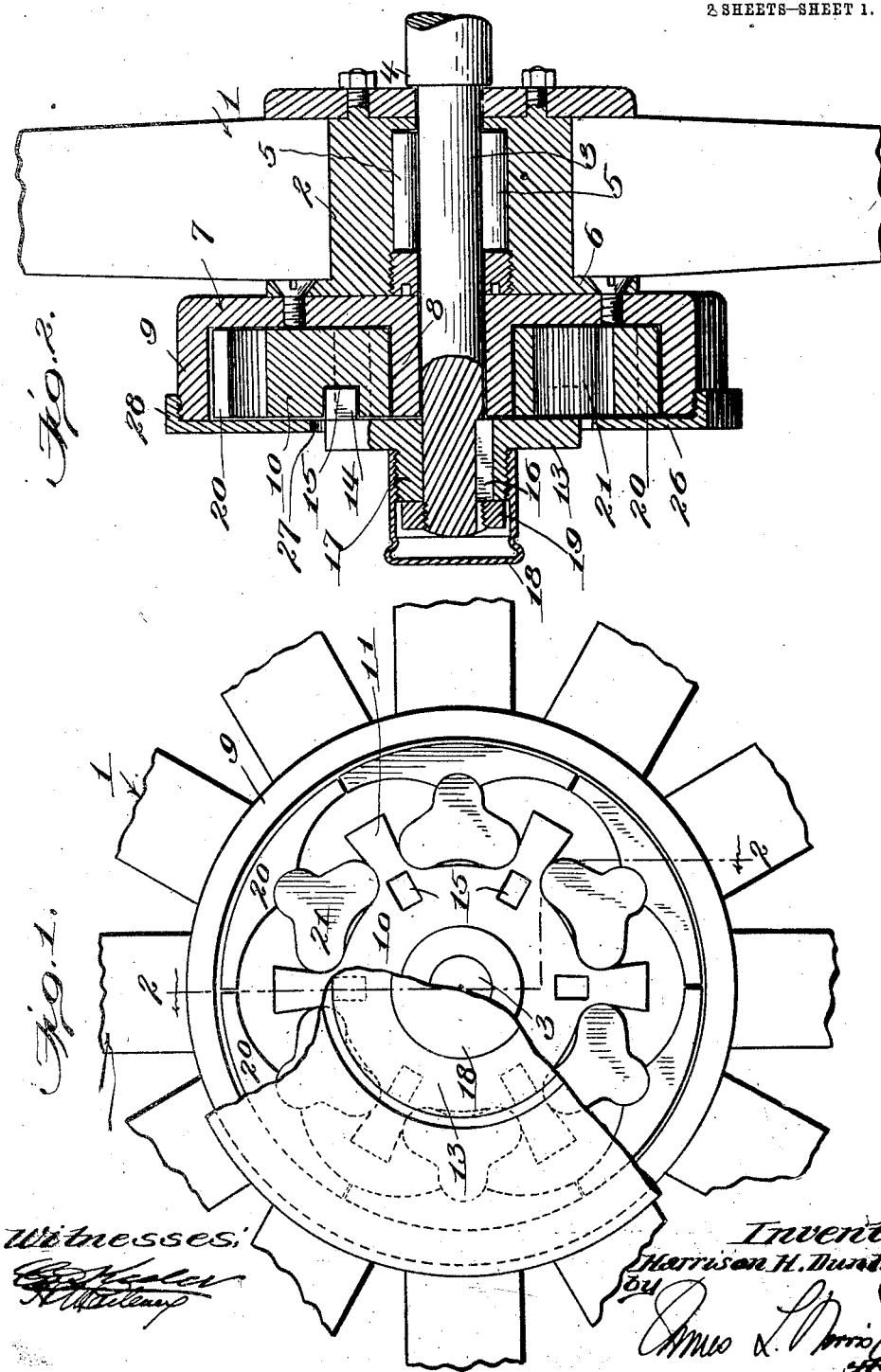

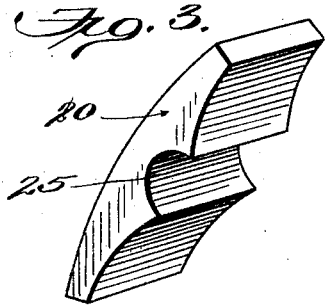
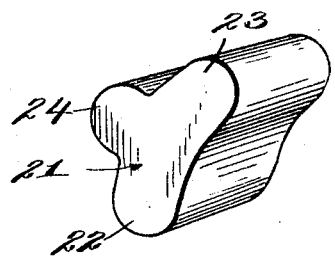
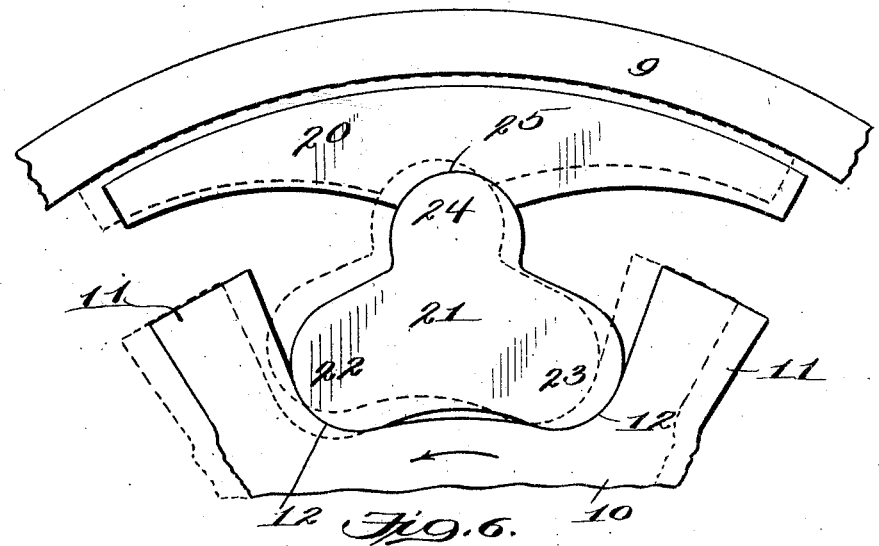
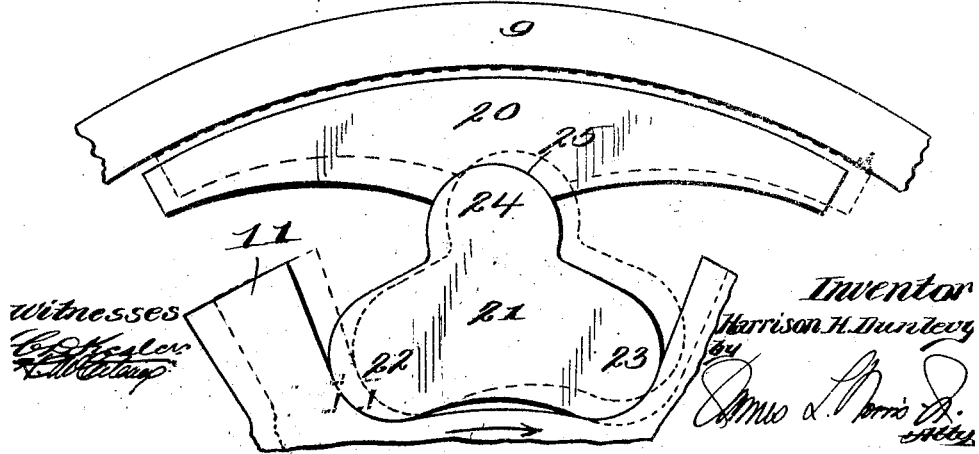

HARRISON H. DUNLEVY, OF WHEELING, WEST VIRGINIA.

AXLE-CLUTCH.

1,047,182.	Specification of Letters Patent.	Patented Dec. 17, 1912.

Application filed October 23, 1911. Serial No. 656,226.

*To all whom it may concern:*

Be it known that I, HARRISON H. DUNLEVY, a citizen of the United States, residing at Wheeling, in the county of Ohio and State of West Virginia, have invented new and useful Improvements in Axle-Clutches, of which the following is a specification.

This invention relates to axle clutches, and more particularly to clutches of the type specified which are used for the purpose of connecting the wheels and driving axle of a motor car or other self-propelled vehicle in such a manner that either wheel is free to over-run the other and the axle, under certain circumstances, the wheel revolving at the lower rate of speed at such time serving to propel the vehicle, while the over-running wheel rotates idly.

The invention comprehends, briefly, an improved clutch which is designed for use in place of the ordinary forms of differential now employed, and for attachment directly to the outer faces of the driving wheels, the construction and arrangement of its component parts being such as to admit of its application to any of the well-known makes of car without involving any material alteration of the wheels already used thereon or the employment of specially constructed additional or substitute parts.

An embodiment of the invention is illustrated in the accompanying drawings, whereof—

Figure 1 is a broken front elevation of said invention applied to a motor car wheel; Fig. 2 is a vertical section on the line 2—2 of Fig. 1; Figs. 3 and 4 are perspective views, respectively, of a friction shoe and a rocker included in the clutch; and Figs. 5 and 6 are enlarged fragmental diagrammatic views showing the movements of the rocker and shoe during the revolution of the wheel in both directions.

In said drawings, 1 indicates, generally, a motor car wheel of any conventional make, and 2 the hub portion thereof, said wheel being revolubly mounted upon the reduced portion or spindle 3 of the driving axle 4, between which spindle and the hub there is interposed a series of anti-friction rollers 5.

The driving clutch constituting the subject matter of this case is secured directly to the outer hub flange 6 and consists, preferably, of a casing 7 provided with an axial sleeve portion 8 and a peripheral flange or wall 9, the latter part serving as a friction element, as hereinafter described. Spindle 3 passes loosely through sleeve 8. Within said casing there is inclosed a star-wheel 10 whose teeth 11 taper slightly inward at their inner ends, the points at which said teeth join the body of the wheel being curved or rounded to produce the seats 12, subsequently referred to. Wheel 10 is revolubly mounted upon sleeve 8 and is rotated by means of a clutch disk 13 whose inner face is provided adjacent its peripheral edge with a series of lateral teeth 14 that project into correspondingly shaped seats 15 formed in the outer face of the star-wheel. This disk is keyed to spindle 3, as indicated by the numeral 16, so as to rotate therewith, and is further provided with an outwardly extending hub 17 upon which is threaded a cap 18, the latter element inclosing said hub and, also, the usual retaining nut 19 that is threaded on the terminal of the spindle. While the afore-mentioned star-wheel is preferably employed, it will be apparent that a spider or other analogous element of like construction provided with spaced, radially-extending teeth may be substituted.

The friction element 9 is engageable by a series of friction shoes 20 which are operated by rockers 21. The last-mentioned elements are of one-piece construction and have an approximately triangular shape; they are of such a size as to fit in the spaces between adjacent teeth 11, and the ends 22 and 23 of their body portions are rounded, so as to conform to the shape of the seats 12; their apices 24 are likewise rounded and fit in correspondingly shaped centrally located seats 25 formed in the inner faces of the friction shoes, which latter are substantially arc-shaped and are thickened or enlarged transversely, at the point indicated, the curvature of the outer faces of the shoes being the same as that of the element 9.

In addition to the parts described above, the casing 7 may be equipped with a cover plate 26 having a central opening 27 in which the clutch disk 13 is disposed. This plate may be attached to the casing in any suitable manner, but preferably by means of an internally threaded peripheral flange 28 with which it is provided, said flange fitting the threaded outer portion of the casing wall or flange 9.

The construction above described is designed to replace the differential now in general use, as already stated, the transmission shaft being connected directly to the driving axle by ordinary bevel gearing. It will be seen, therefore, that the axle may well be of one-piece construction, instead of the usual two-piece construction, although the clutches, which are applied directly to the hubs of both driving wheels, do not require the substitution of the one-piece for the two-piece construction.

When the car is in motion, the power transmitted to the axle will be transmitted by that part to the star-wheels, through the agency of the clutch disks 13. The star-wheels, in turn operate the shoes 20, causing the outer surfaces thereof to frictionally grip the inner surface of the casing flanges 9, whereupon said casings and, with them, the car wheels, will be caused to rotate. The friction shoes are moved outwardly toward and against the casing flanges by the rockers 21, which latter, on being actuated, act in the same manner as a toggle. The action of these rockers is illustrated in Figs. 5 and 6, which depict the rotation of the star-wheel in both directions. When said wheel rotates in a counter-clockwise direction, the right-hand tooth 11 thereof will bear against the adjacent end 23 of the rocker directly in advance thereof, with the result that the opposite end 22 is moved slightly outwardly from its seat 12, while the apex 24 is also forced outwardly, thus pressing the shoe forcibly against the casing flange. In this instance the end 23 of the rocker constitutes its fulcrum, and the pressure exerted by the adjacent tooth against that end is transmitted both toward the end 22 and toward apex 24, the rocker and shoe assuming the dotted line positions. When the star-wheel rotates clockwise, the rocker and shoe move in a reverse direction to that above described. On taking a curve, the action of the two car wheels differs slightly from the foregoing, since the outer wheel must revolve at a greater speed than the inner wheel, and, therefore, over-runs the axle. In such instance, the resistances opposed to the two wheels are unequal, as the greater resistance is opposed to the inner wheel and requires greater pressure to be overcome. In consequence, the power transmitted to the driving axle is distributed unequally therefrom, the greater part being transmitted to the inner wheel, through the agency of the corresponding star-wheel, so that that wheel acts as the driver; on the other hand, the power supplied to the outer star-wheel is insufficient to effectually force the shoes against the casing flange, so that the outer car wheel is thus free to rotate at the necessarily increased speed.

The construction and arrangement of the rockers are such as to enable them to turn or swing upon either end as a fulcrum during the rotation of the star wheel, and since they merely fit loosely in the spaces between the teeth of the star wheel and have no positive or permanent connection with either that wheel or the casing or its cover, they constitute in effect floating parts. This is also true of the friction shoes which have only a loose engagement with the apices of the rockers.

It will be understood from the foregoing that the device as a whole can be applied to the wheels of any of the ordinary makes of motor car now in general use, and, moreover, without requiring other alteration than the substitution of bevel gearing for the differential customarily employed, since the device is attached directly to the outer face of the wheel hub and does not necessarily involve even the removal of the wheels.

I claim as my invention:

1. A differential clutch comprising a casing provided with a peripheral wall constituting a friction element; a star-wheel rotatably mounted within said casing and adapted to be positively driven, said wheel being formed with curved seats at the junctions between its teeth and body; a series of substantially triangular floating rockers disposed in the spaces between adjacent teeth and formed with curved ends normally occupying said seats; and a series of floating friction shoes loosely mounted upon the apices of said rockers, each tooth of said wheel being adapted to press laterally against the adjacent end of the rocker directly in advance thereof, for turning the rocker upon that end as a fulcrum, to move the opposite end and apex of said rocker outwardly and force the corresponding shoe against said friction element.

2. A differential clutch comprising a casing provided with a peripheral wall constituting a friction element; a star-wheel rotatably mounted within said casing and adapted to be positively driven, said wheel being formed with curved seats at the junctions between its teeth and body; a series of substantially triangular floating rockers disposed in the spaces between adjacent teeth and formed with curved ends normally occupying said seats, and with curved apices; and a series of floating arcuate friction shoes formed upon their inner faces with centrally-located curved seats wherein said apices are loosely received, each tooth of said wheel being adapted to press laterally against the adjacent end of the rocker directly in advance thereof, for turning the rocker upon that end as a fulcrum, to move the opposite end and apex of said rocker outwardly and force the corresponding shoe against said friction element.

In testimony whereof I have hereunto set my hand in presence of two subscribing witnesses.

HARRISON H. DUNLEVY.

Witnesses:
 ALBERT A. FUCHS,
 GEO. W. BREMER.